(12) United States Patent
Lin

(10) Patent No.: US 9,216,619 B2
(45) Date of Patent: *Dec. 22, 2015

(54) AIR MAINTENANCE TIRE AND VALVE ASSEMBLY

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 341 days.

This patent is subject to a terminal disclaimer.

(21) Appl. No.: 13/964,175

(22) Filed: Aug. 12, 2013

(65) Prior Publication Data

US 2015/0041036 A1 Feb. 12, 2015

(51) Int. Cl.
*B60C 23/12* (2006.01)
*B60C 29/04* (2006.01)

(52) U.S. Cl.
CPC .............. *B60C 23/12* (2013.01); *B60C 29/04* (2013.01); *Y10T 152/10495* (2015.01)

(58) Field of Classification Search
CPC .......... B60C 23/10; B60C 23/12; B60C 29/04
USPC ................................. 152/419, 423, 424, 426
See application file for complete search history.

(56) References Cited

U.S. PATENT DOCUMENTS

| | | | | |
|---|---|---|---|---|
| 1,050,886 | A | * | 1/1913 | Wetherell ....................... 154/426 |
| 3,304,981 | A | * | 2/1967 | Leslie ............................ 152/426 |
| 8,042,586 | B2 | | 10/2011 | Losey |
| 8,113,254 | B2 | | 2/2012 | Benedict |
| 8,381,785 | B2 | * | 2/2013 | Losey ............................ 152/450 |
| 8,991,456 | B2 | * | 3/2015 | Gobinath |
| 2009/0294006 | A1 | * | 12/2009 | Hrabal ........................... 152/426 |
| 2011/0146867 | A1 | * | 6/2011 | Benedict ........................ 152/426 |
| 2011/0146868 | A1 | * | 6/2011 | Losey et al. ................... 152/426 |
| 2013/0008579 | A1 | * | 1/2013 | Delgado ........................ 152/523 |

FOREIGN PATENT DOCUMENTS

| | | |
|---|---|---|
| EP | 2343200 A2 | 7/2011 |
| EP | 2687384 A1 | 1/2014 |

OTHER PUBLICATIONS

European Search Report, dated Dec. 9, 2014, 2 pages.

* cited by examiner

*Primary Examiner* — Kip T Kotter
(74) *Attorney, Agent, or Firm* — Robert N. Lipcsik

(57) ABSTRACT

An air maintenance tire and pump assembly includes a tire having a tire cavity, first and second sidewalls extending from first and second tire bead regions, respectively, to a tire tread region, an elongate substantially annular air passageway enclosed within a bending region of the sidewalls, the air passageway operatively closing and opening, segment by segment, as the bending region of the sidewalls passes adjacent a rolling tire footprint to pump air along the air passageway, an air inlet port assembly coupled to, and in air flow communication with, the air passageway at an inlet air passageway junction, the air inlet port assembly being operable to channel inlet air from outside of the tire into the air passageway, the air inlet port assembly including an inlet control valve and an outlet tee structure positioned 180° opposite the inlet control valve in the air passageway for moving air into the tire cavity, the inlet control valve including two inlet check valves for ensuring air flow only into, and not out of, the inlet control valve, the air passageway, a corresponding plain tee inlet structure, and the tire cavity.

14 Claims, 16 Drawing Sheets

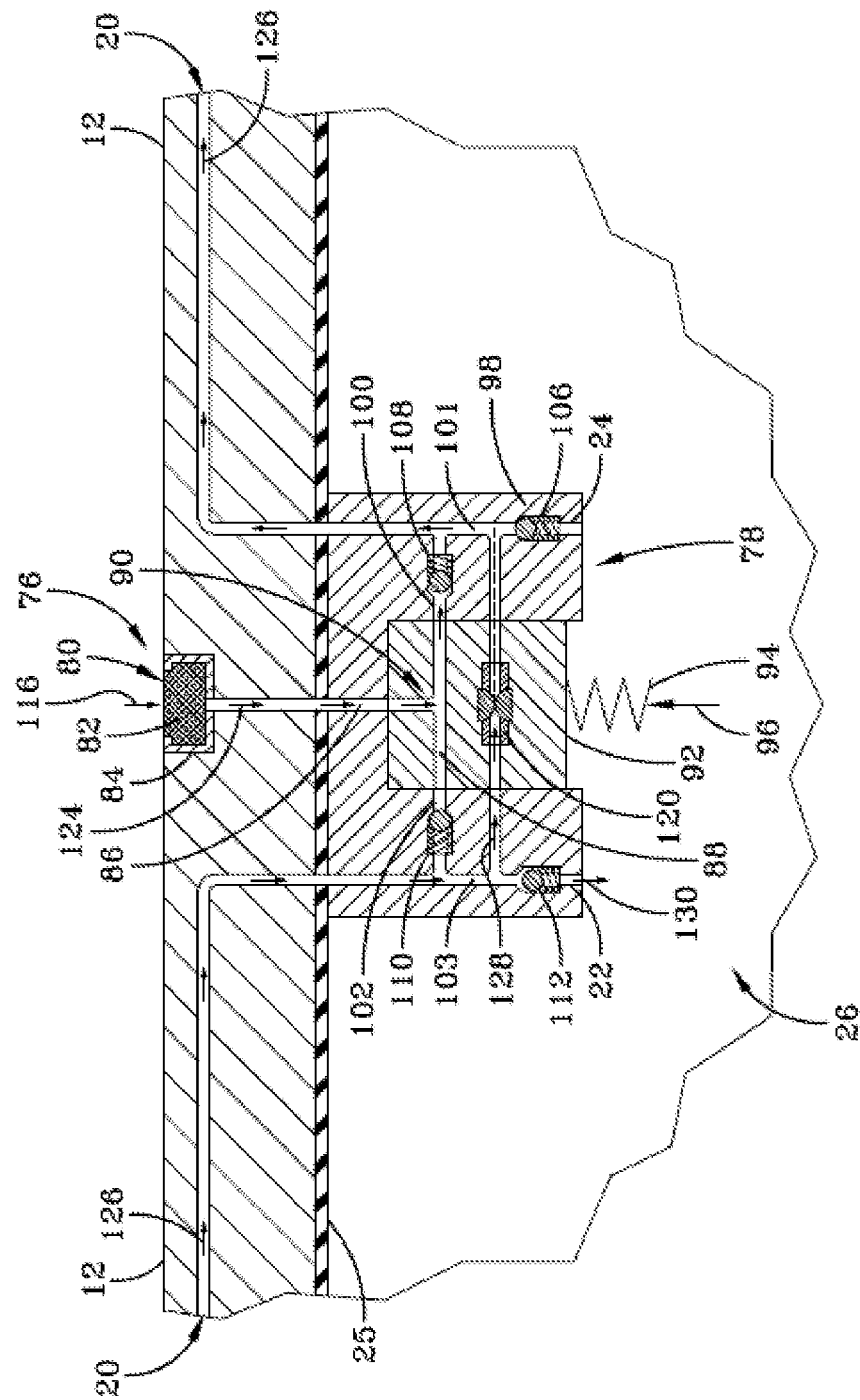

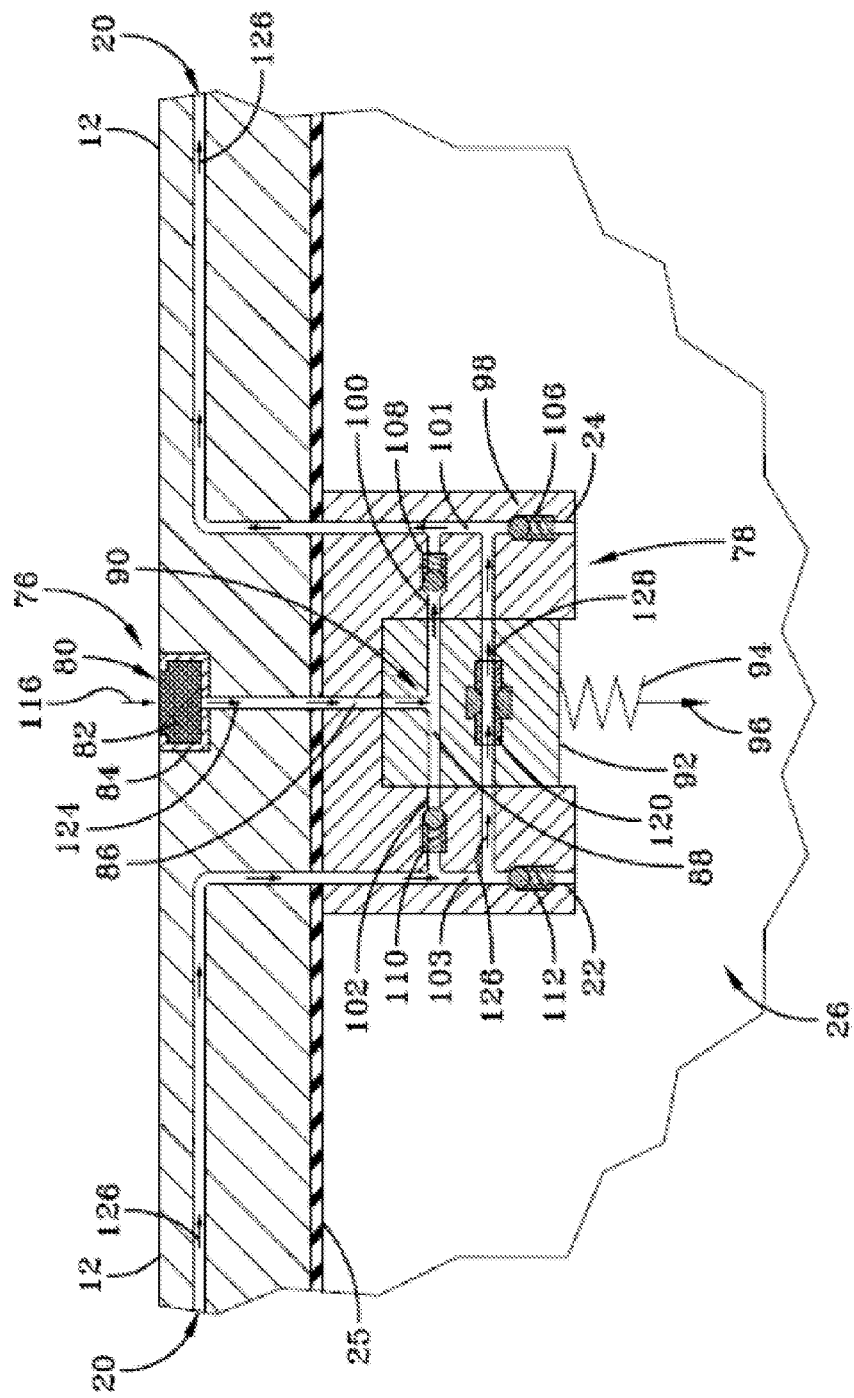

AIR MAINTENANCE TIRE AND VALVE ASSEMBLY

FIELD OF THE INVENTION

The present invention relates generally to air maintenance tires and, more specifically, to a control valve assembly.

BACKGROUND OF THE INVENTION

Normal air diffusion reduces tire pressure over time. Hence, the usual state of tires is underinflated. Accordingly, drivers must repeatedly act to maintain tire pressures or they will see reduced fuel economy, tire life, and/or reduced vehicle braking and handling performance. Tire Pressure Monitoring Systems have been proposed to warn drivers when tire pressure is significantly low. Such systems, however, remain dependant upon the driver taking remedial action when warned to re-inflate a tire to the recommended pressure. It is a desirable, therefore, to incorporate an air maintenance feature within a pneumatic tire that will maintain correct air pressure within the tire without a need for driver intervention to compensate for any reduction in tire pressure over time.

SUMMARY OF THE PRESENT INVENTION

An air maintenance tire and pump assembly in accordance with the present invention includes a tire having a tire cavity, first and second sidewalls extending from first and second tire bead regions, respectively, to a tire tread region, an elongate substantially annular air passageway enclosed within a bending region of the sidewalls, the air passageway operatively closing and opening, segment by segment, as the bending region of the sidewalls passes adjacent a rolling tire footprint to pump air along the air passageway, an air inlet port assembly coupled to, and in air flow communication with, the air passageway at an inlet air passageway junction, the air inlet port assembly being operable to channel inlet air from outside of the tire into the air passageway, the air inlet port assembly including an inlet control valve and an outlet tee structure positioned 180° opposite the inlet control valve in the air passageway for moving air into the tire cavity, the inlet control valve including two inlet check valves for ensuring air flow only into, and not out of, the inlet control valve, the air passageway, a corresponding plain tee inlet structure, and the tire cavity.

According to another aspect of the assembly, the inlet check valves are ball check valves.

According to still another aspect of the assembly, the outlet tee structure includes two outlet check valves for ensuring air flow only into, and not out of, the tire cavity.

According to yet another aspect of the assembly, the outlet check valves are ball check valves.

According to still another aspect of the assembly, a first pinch point is defined by a portion of the air passageway adjacent the rolling tire footprint such that the first pinch point rotates in a clockwise direction about the tire.

According to yet another aspect of the assembly, two 180° portions of the air passageway both pump air into the tire cavity as the first pinch point rotates in the clockwise direction.

According to still another aspect of the assembly, a second pinch point is defined by a portion of the air passageway adjacent the rolling tire footprint such that the second pinch point rotates in a counterclockwise direction about the tire.

According to yet another aspect of the assembly, the two 180° portions of the air passageway both pump air into the tire cavity as the second pinch point rotates in the clockwise direction.

A method in accordance with the present invention comprises the steps of: operatively closing and opening an annular air passageway within a sidewall of the tire, segment by segment, as a bending region of the sidewall passes adjacent a rolling tire footprint to pump air along the air passageway; coupling an air inlet port assembly to, and in air flow communication with, the air passageway at an inlet air passageway junction; and channeling inlet air from outside of the tire through the air inlet port assembly into the air passageway such that a pinch point of the air passageway travels about the along the air passageway.

According to another aspect of the method, the method further includes the step of rotating the pinch point to a one o'clock position just to the right of an outlet tee structure such that the pinch point is moving away from the outlet tee structure.

According to still another aspect of the method, the method further includes the step of rotating the pinch point to a four o'clock position relative to the outlet tee structure such that the pinch point is moving away from the outlet tee structure such that air is forced into a tire cavity.

According to yet another aspect of the method, the method further includes the step of rotating the pinch point to a seven o'clock position relative to the outlet tee structure such that the pinch point is moving toward the outlet tee structure.

According to still another aspect of the method, the method further includes the step of rotating the pinch point to a nine o'clock position relative to the outlet tee structure such that the pinch point is moving toward the outlet tee structure such that air continues to be forced to flow through the air passageway from the nine o'clock position to the outlet tee structure and into the tire cavity and, simultaneously, vacuum in trailing portions of the air passageway forces the trailing portions to fill with air through the inlet control valve.

According to yet another aspect of the method, the method further includes the step of rotating the pinch point to a eleven o'clock position relative to the outlet tee structure such that the pinch point is moving toward the outlet tee structure as air continues to be forced to flow through the air passageway from the eleven o'clock position to the outlet tee structure and into the tire cavity, and, simultaneously, vacuum in the trailing portions continue to fill with air through the inlet control valve.

According to still another aspect of the method, all of the previous steps are performed when the pinch point rotates in both a clockwise and counterclockwise direction.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Ball check valve" is a check valve in which the closing member, the movable part to block the air flow, is a spherical ball. In some ball check valves, the ball is spring-loaded to help keep it shut and require a specified magnitude of upstream pressure on the ball to overcome the bias of the valve spring for the valve to open. The interior surface of the main seats of ball check valves may be conically-tapered to guide the ball into the seat and form a positive seal when stopping reverse flow.

"Chafer" is a narrow strip of material placed around the outside of a tire bead to protect the cord plies from wearing and cutting against the rim and distribute the flexing above the rim.

"Check valve" is a two-port valve having two openings in the body, one for air to enter and the other for air to leave.

"Circumferential" means lines or directions extending along the perimeter of the surface of the annular tread perpendicular to the axial direction.

"Cracking pressure" is the minimum upstream pressure at which the valve will operate. Typically, a check valve is designed for and can therefore be specified for a specific cracking pressure.

"Downstream" is a direction away from the source of power, i.e. the direction away from the source of air flow. In the context of a valve, "downstream" refers to a side of the valve from which air flows out of the valve when an "upstream" air flow on the valve exerts cracking pressure sufficient to open the valve.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a sidewall that may extend circumferentially or laterally about the tread in a straight, curved, or zigzag manner. Circumferentially and laterally extending grooves sometimes have common portions. The "groove width" is equal to the surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which they interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape adjacent to grooves.

"Tread Arc Width" means the arc length of the tread as measured between the lateral edges of the tread.

"Upstream" is a direction toward the source of air flow power, i.e. the direction from which air flows or is coming from. In the context of a valve, "upstream" refers to a side of the valve into which air flows when an "upstream" air flow on the valve exerts cracking pressure sufficient to open the valve.

BRIEF DESCRIPTION OF THE DRAWINGS

The present invention will be described by way of example and with reference to the accompanying drawings, in which:

- FIG. 5B is a cross-sectional schematic diagram of the inlet portal of the FIG. 5A alternative example peristaltic pump bi-directional valve filling a tire with the tire in a clockwise rotation and showing the five port regulator.

FIG. 5C is a cross-sectional schematic diagram of the inlet portal of the FIG. 5B alternative example peristaltic pump bi-directional valve with clockwise tire rotation and the valve in a bypass mode.

DETAILED DESCRIPTION OF EXAMPLES OF THE PRESENT INVENTION

Figure 1:
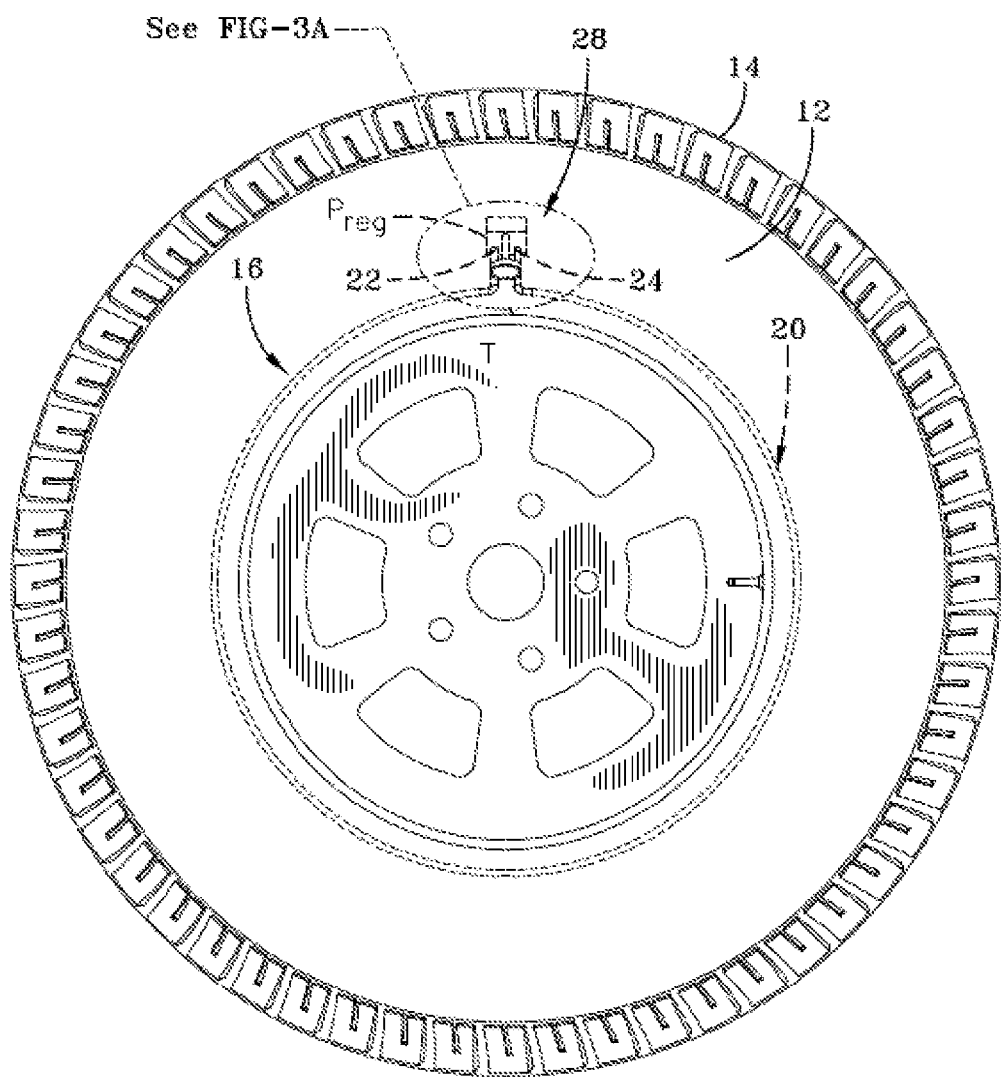
FIG. 1 is an isometric view of tire, rim and tubing with an example peristaltic pump and inlet valve for use with the present invention.
Figure 2A:
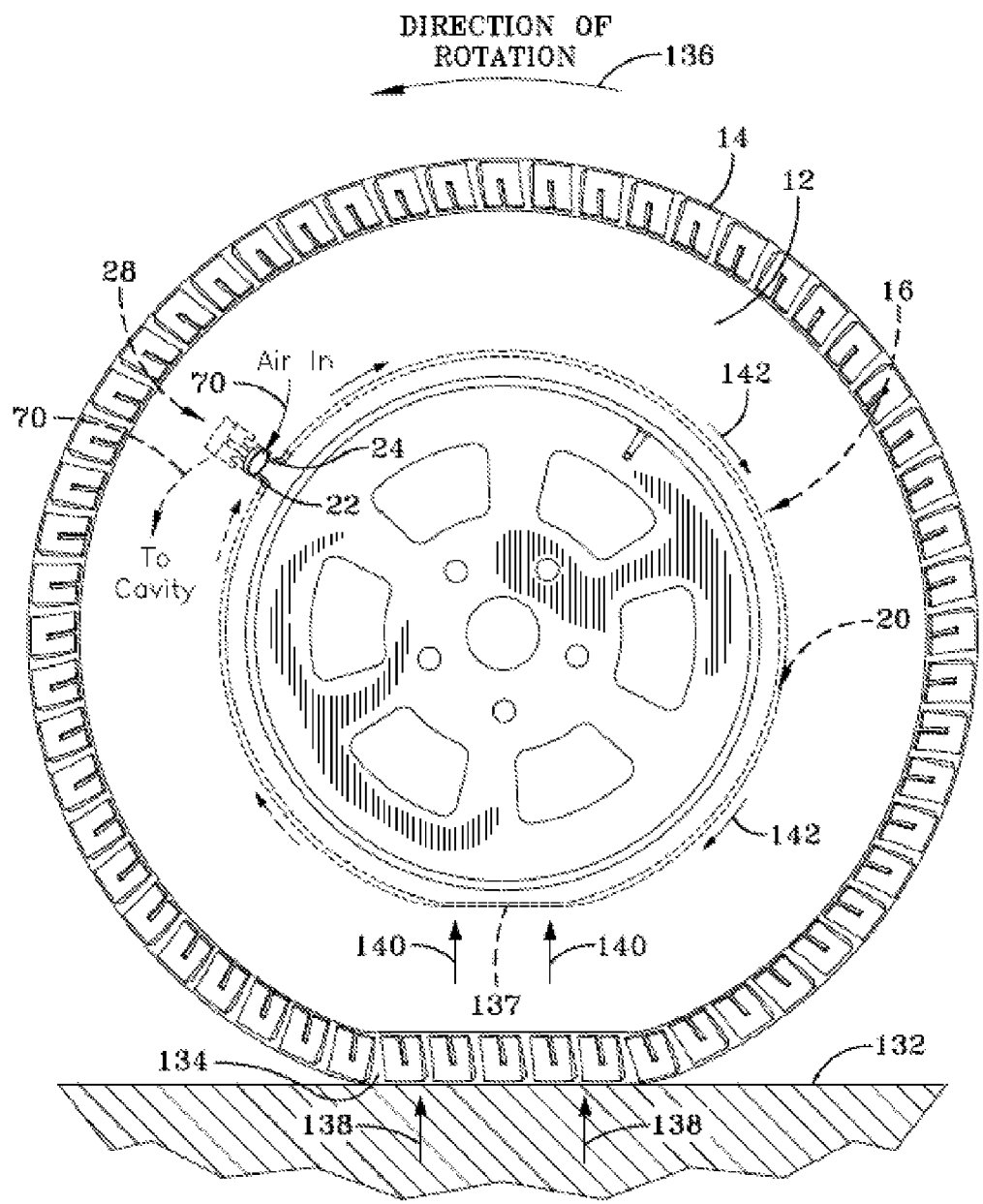
FIG. 2A is a side view of the tire and example peristaltic pump assembly of FIG. 1 with the tire rotating counterclockwise and establishing a footprint against a ground surface.
Figure 2B:
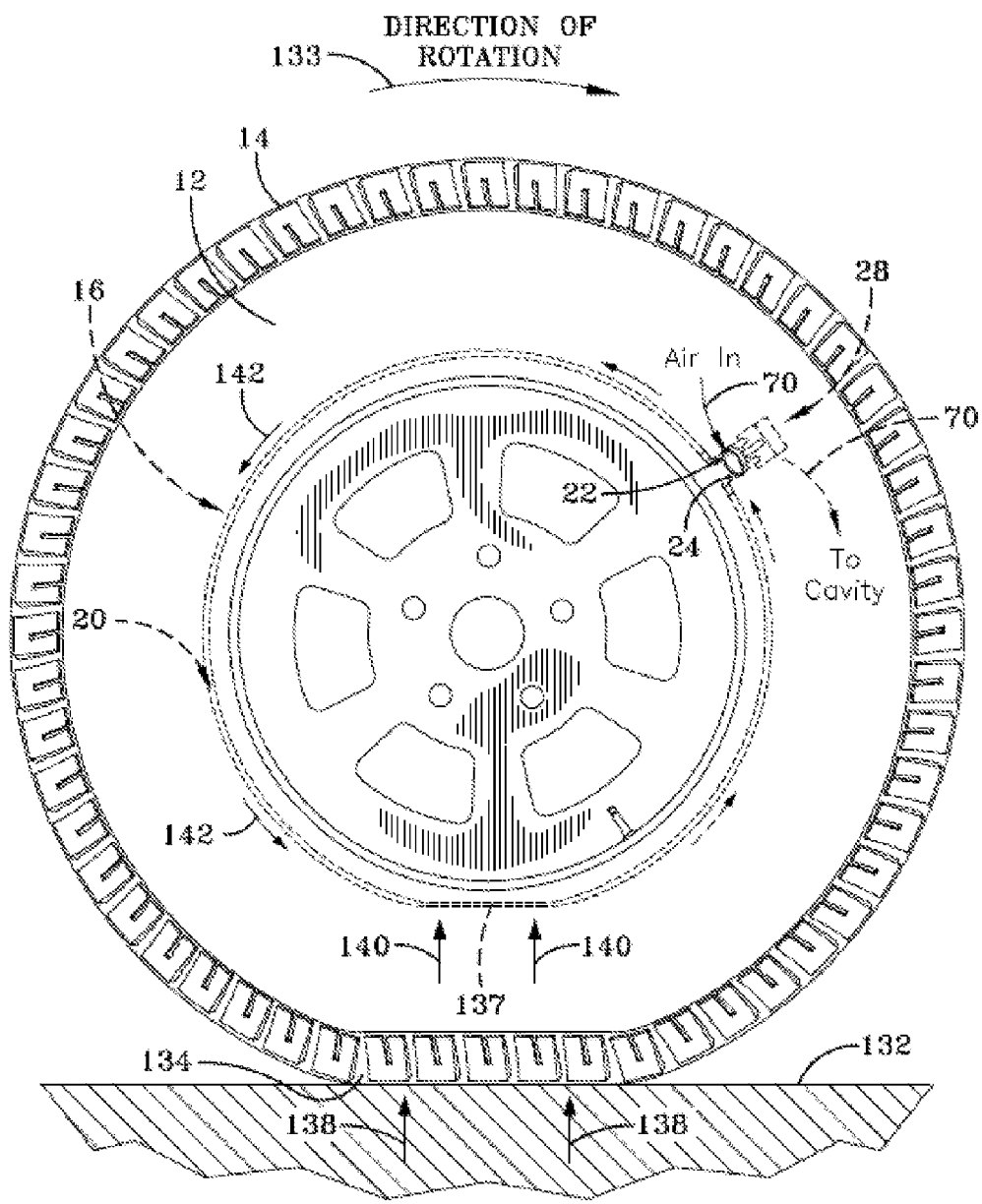
FIG. 2B is a side view of the tire and example peristaltic pump assembly of FIG. 1 with the tire rotating clockwise against a ground surface.

Referring to FIGS. 1, 2A and 2B, a pneumatic tire and pump assembly may include a pair of sidewalls 12 extending to a tread 14 and enclosing a tire air cavity 26 defined by an innerliner 25. A peristaltic pump assembly 16 may be attached to one or both of the sidewalls 12 in a generally high bend region of the sidewall(s). The peristaltic pump assembly 16 may include an annular air passageway 20 either: 1) in the form of an independent tube formed separately from the tire and assembled with the tire in a post-manufacture procedure; or 2) an air passageway formed as an integral void within the sidewall(s) 12 during tire manufacturing. The air passageway 20 may be enclosed by the sidewall 12 and may extend along an annular path about a region of the sidewall that experiences a high flex or bend as the pneumatic tire rotates under load. If in an independent tube form, the tube may be formed of a resilient, flexible material, such as plastic, rubber, and/or polymer compounds capable of withstanding repeated cyclic deformation, with the tube deforming into a flattened condition subject to a load and, upon removal of such load, returning to an original condition generally circular in cross-section. If the air passageway is integrally formed within the sidewall, the air passageway likewise withstands repeated cyclic deformation and recovery as the tire rotates under load and operatively passes a volume of air sufficient for the purpose described herein. The general operation of an air tube in a peristaltic pump is described in U.S. Pat. No. 8,113,254, which is incorporated herein by reference.

Opposite ends 22, 24 of the air passageway 20 may terminate at an inlet port assembly 28. The inlet port assembly 28 may be affixed to rotate with the tire as the tire rotates against a ground surface 132. Rotation of the tire creates a footprint 134 against the ground surface 132, which in turn introduces compression force 138 into the pneumatic tire. The compression force 138 in turn may be applied at 140 into the air passageway 20 causing segment by segment collapse of the passageway as the tire rotates under load. The segment by segment collapse of the air passageway 20 may occur whether the tire rotates in a counterclockwise direction 136 in FIG. 2A or a clockwise direction 133 in FIG. 2B. The peristaltic pump assembly 16 is thus bi-directional or reversible in operating to pump air into the tire cavity 26 in either a forward or a reverse direction of air flow continuously throughout a 360 degree tire rotation.

As the tire rotates in both forward and rearward directions 136, 133 in FIG. 2A or 2B, respectively, the air passageway 20 may be flattened segment by segment whether the passageway is in the form of a separate sidewall embedded tube or an integrally formed void. The segment by segment sequential flattening 137 of the air passageway 20 may move in a direction 142 opposite to the direction of tire rotation in FIGS. 2A and/or 2B. The sequential flattening 137 of the passageway 20, segment by segment, may evacuate air from the flattened segments to be pumped in the direction 142 toward the inlet port assembly 28 where the air is directed to the tire cavity 26. Air pressure within the tire cavity 26 may thus be maintained at a desired threshold pressure. Air admitted by the inlet port assembly 28 into the air passageway 20 may replenish air pumped into the tire cavity 26 or recirculated out of the pump assembly 16, if not needed to maintain tire pressure at the desired level.

Figure 3A:
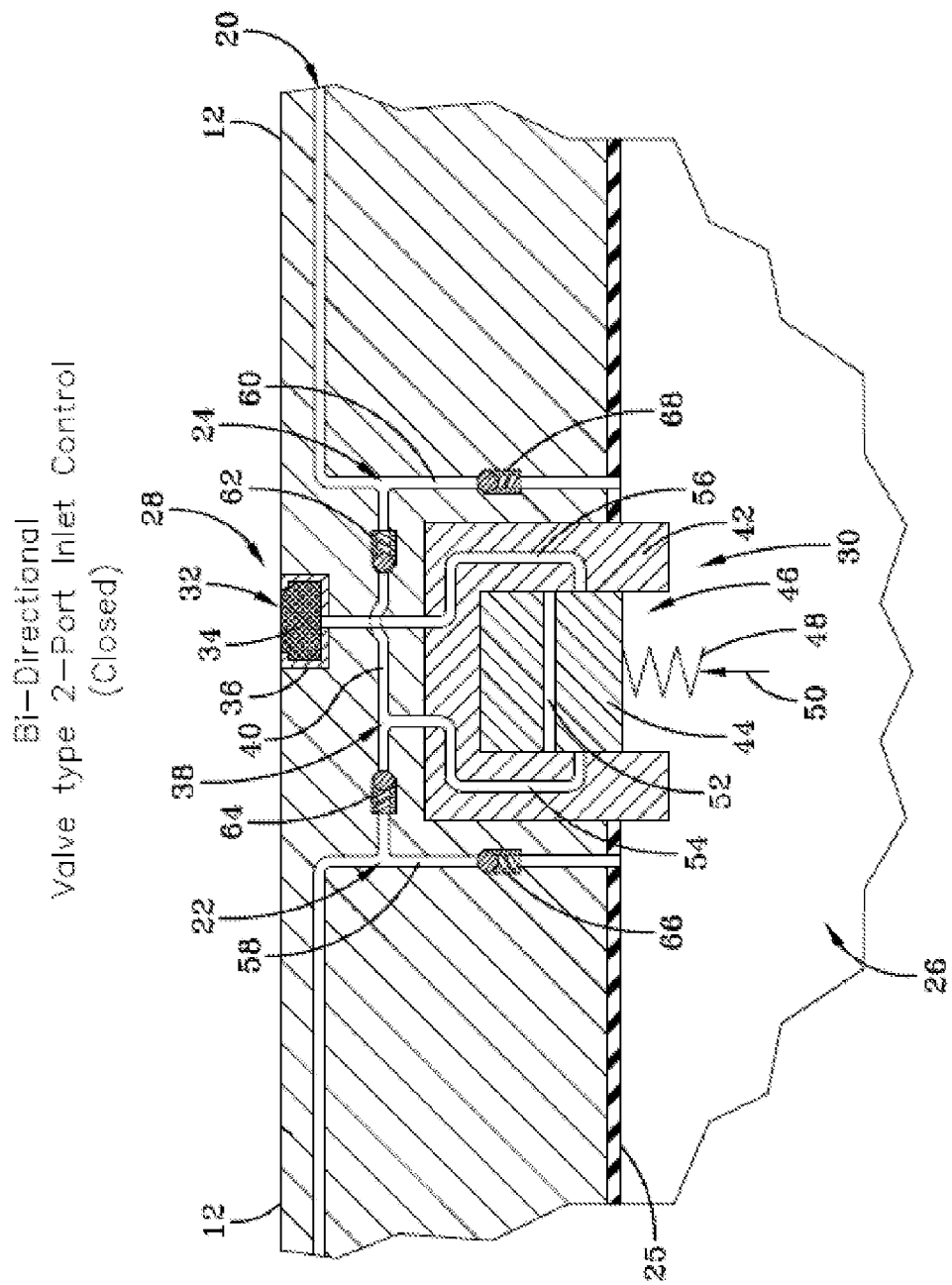
FIG. 3A is a cross sectional schematic diagram of the inlet portal of the example peristaltic pump of FIG. 1 having a two-port inlet control valve in the closed position.
Figure 3B:
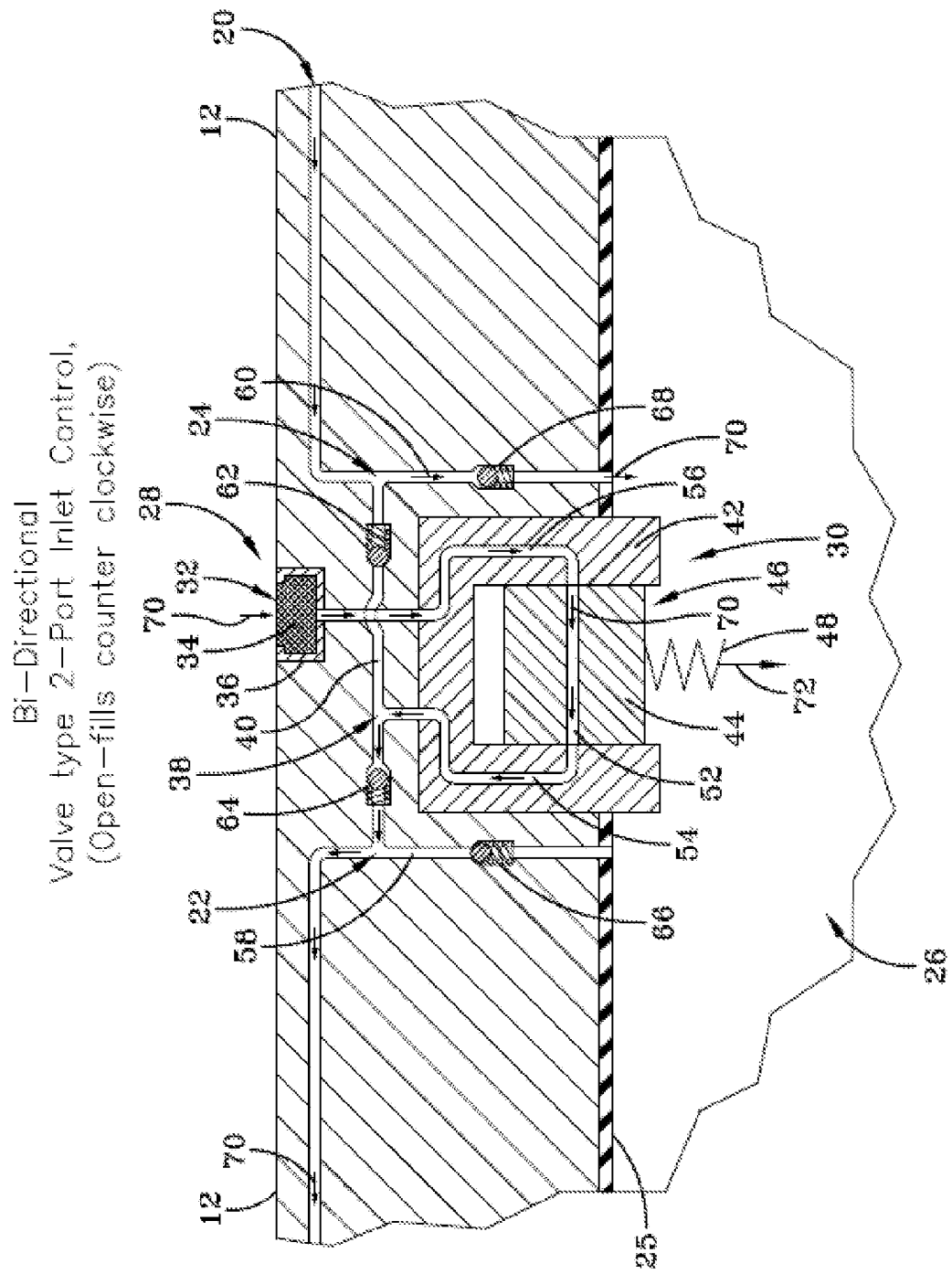
FIG. 3B is a cross sectional schematic diagram of the inlet portal of the example peristaltic pump of FIG. 1 having a two-port inlet control valve in the open position operable to fill the tire with the tire rotating in a counter clockwise direction.
Figure 3C:
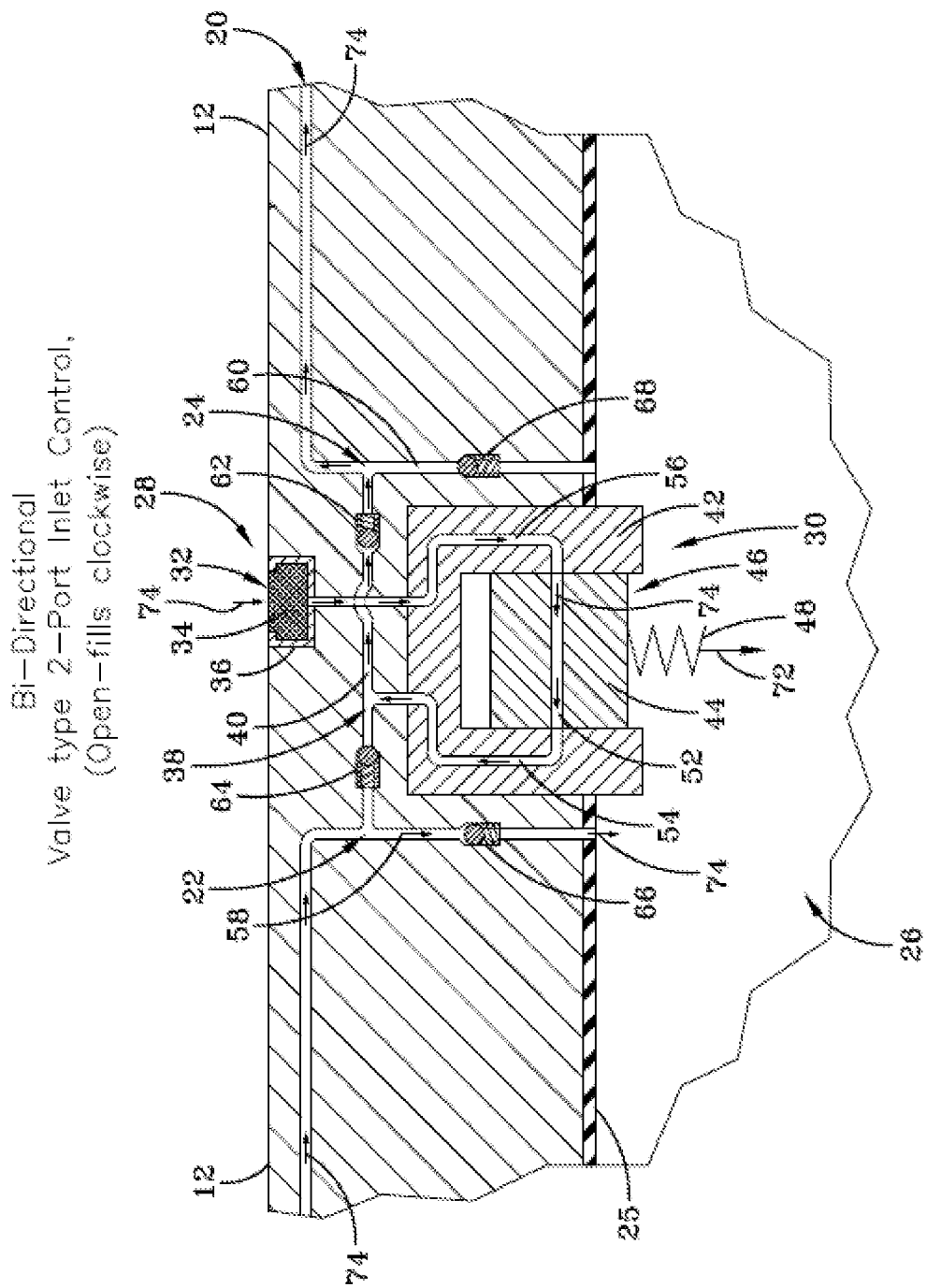
FIG. 3C is a cross-sectional schematic diagram of the inlet portal of the example peristaltic pump of FIG. 1 with the bi-directional valve having two-port inlet control which fills the tire with the tire rotating in a clockwise direction.

The inlet port assembly 28 may include a regulator valve assembly 30 and a filtered air entry port 32. A two port, bi-directional inlet control assembly 28 is shown in FIGS. 3A through 3C. FIG. 3A represents Inlet Control in a closed position; FIG. 3B represents Inlet Control in an open position with air flow moving counter-clockwise and the tire rotating clockwise; and FIG. 3C represents Inlet Control in an open position with air flow moving clockwise and the tire rotating counter-clockwise. It may be appreciated that the system is bi-directional, with air flow within the air passageway 20 in one and/or two directions as the tire rotates under load, with the direction of air flow within the air passageway 20 determined by a forward or reverse direction of tire rotation. Pumping along the air passageway 20 may occur in either direction, alternatively, throughout an entire 360 degree rotation of the pneumatic tire under load.

A filtered air entry port 32 may be positioned at the outer surface of a tire sidewall 12 and outside air may be admitted into the entry port through a cellular filter 34 housed within a cylindrical housing 36. FIG. 3A shows the assembly 28 in a closed condition in which air from outside the tire is prevented from passing through the entry port 32 (e.g., a condition occurring when the pressure within the tire cavity 26 is at or above a regulated pressure threshold $P_{REG}$). An air passageway conduit 56 may extend from the filter housing 36 to the regulator valve assembly 30 and may conduct inlet air to the valve assembly. From the regulator valve assembly 30, an outlet conduit 54 may carry air flow to a connecting conduit 40 which conducts air into oppositely directed valves 62, 64 positioned adjacent and on opposite sides of an inlet junction 38. As used herein, "inlet junction" may refer to a location in the air passageway 20 conducting inlet air from the assembly 28 to upstream sides of inline stop valves. Alternative examples of the pump assembly 16 are shown in FIGS. 3A through 3C, 4A through 4C, and 5A through 5D.

The regulator valve assembly 30 may have a valve housing 42 and a valve piston 44 residing within a cylinder or housing chamber 46. A biasing mechanism, such as a spring 48, may exert a biasing force (see arrow 72 in FIGS. 3B, 3C) on the piston 44, biasing the piston downward within cylinder 46 into an "open" or "tire-fill" location as indicated in FIGS. 3B & 3C. When the pressure within the tire cavity 26 is at or greater than the pressure setting level $P_{REG}$, the pressure will overcome the biasing force of the spring 48 and force (see arrow 50) the piston 44 upward within the cylinder 46 into the "closed" or "no-fill" location of FIG. 3A. The piston 44 may include a transversely extending air conduit 52 extending across the piston 44. In the "closed" position of FIG. 3A, the conduit 52 is misaligned with respect to the air conduits 54, 56 and air cannot flow across the piston 44 to conduits 54, 56, and from there to the inlet junction 38. In the "closed" position, consequently, air flow is prevented from reaching the inlet junction 38 and from reaching the upstream sides of the valves 62, 64. Air flow into the passageway 20 may thus be precluded with the valve assembly 30 in the closed position of FIG. 3A.

FIG. 3B shows the valve assembly 30 moving to an "open" position. The pneumatic tire may rotate in a clockwise direction, causing air to be pumped along passageway 20 in a counter clockwise direction. A configuration of four one-way valves 62, 64, 66, 68 may be located as shown in FIG. 3B. Two inline valves 62, 64 may be positioned along the conduit 40 on the opposite side of the inlet junction 38. The two inline valves 62, 64 may open in opposite directions along the conduit 40 and conduct air flow in such respective directions with toward the two inline valves 62, 64 in an open condition. The conduit 40 may connect at the downstream side of the valves 62, 64 with the air passageway 20. From the juncture of the conduit 40 and the air passageway 20, radially extending outlet conduit passageways 58, 60 may extend to the tire cavity 26. Positioned along the conduits 58, 60 may be two outlet one-way valves 66, 68, respectively. The valves 66, 68 may be oriented to open in a direction toward the tire cavity 26 to permit the flow of air through the valves 66, 68, along conduits 58, 60, and into the tire cavity.

The one-way valves 62, 64, 66, 68 may be ball or diaphragm check valves, for example. The valves 62, 64, 66, 68 may be oriented to open in the direction shown when pressure at an upstream side of the valve 62, 64, 66, or 68 overcomes a biasing spring and forces the ball away from its seat. The piston 44 may move downward (as seen in the FIGS.) under the biasing force exerted by actuator spring 48. When the air pressure, $P_{REG}$, within the tire cavity 26 falls below a desired pressure threshold limit, movement of the piston 44 may align the air conduit 52 across the piston 44 with the conduits 54, 56 thereby allowing inlet air from the inlet filter port 32 to flow across the piston conduit 52 to the inlet control junction 38 and to the connecting conduit 40. The tire, in rotating clockwise against the ground surface 132 (See FIG. 2B), may collapse the air passageway 20 segment by segment opposite the created tire footprint 134. The collapsed segments may create a vacuum which, in turn, may be refilled segment by segment by a flow of air within the air passageway 20 in a counterclockwise direction 142, drawn in through the inlet port assembly 28.

The counterclockwise flow of input air opens the one-way valve 64, allowing the air to flow into the passageway 20 and circulate in the counterclockwise direction. When the air flow reaches the junction of the conduit 40 and the radial outlet conduit 60, the air cannot flow through the closed valve 62 and must, therefore, flow to the outlet valve 68. The air flow forces the outlet valve 68 open and continues on allow air into the tire cavity 26 as indicated by the arrow 70 (FIG. 3B). When air pressure within the tire cavity 26 reaches the desired preset level, tire pressure against the piston 44 may force the piston into the closed position of FIG. 3A and air flow to the tire cavity may be discontinued (as described above).

This operation of the peristaltic pump assembly 16 may also operate similarly in the reverse tire rotation direction, as will be understood from FIG. 3C. In FIGS. 2A and 3C, with the tire rotating in the counterclockwise direction, air may be pumped in the clockwise direction 142. FIG. 3C shows the inlet port assembly 28 and the regulator valve assembly 30 in such a condition. If pressure within the tire cavity 26 is below the preset $P_{REG}$, the piston 44 is biased by the spring 48 into the open position. The piston conduit 52 may align with the conduits 54, 56 and the air flow may be directed to the junction 40. Rotation of the tire in the counterclockwise direction may cause the air to flow in the clockwise direction 74 as evacuated segments of the passageway 20 are refilled. The air flow in the clockwise direction opens the one way valve 62 and allows air to circulate from the conduit 40 into the passageway 20. The pressurized air may circulate in the passageway 20 and enter the conduit 58 where it is directed against the outlet valve 66, thereby flowing through the outlet valve 66 to the tire cavity 26 as indicated by arrow 74 of FIG. 3C. As in FIG. 3C, when the air flow reaches the juncture of the conduit 40 and the radial outlet conduit 58, air cannot flow through the closed valve 64 and may flow to the outlet valve 66. The air flow that forces the outlet valve 66 open may continue into the tire cavity 26, as indicated by the arrow 70. When air pressure within the tire cavity 26 reaches the desired preset level $P_{REG}$, tire pressure against the face of the piston 44 may force the piston into the closed position of FIG. 3A and air flow to the tire cavity may be discontinued, as explained above.

Figure 4A:
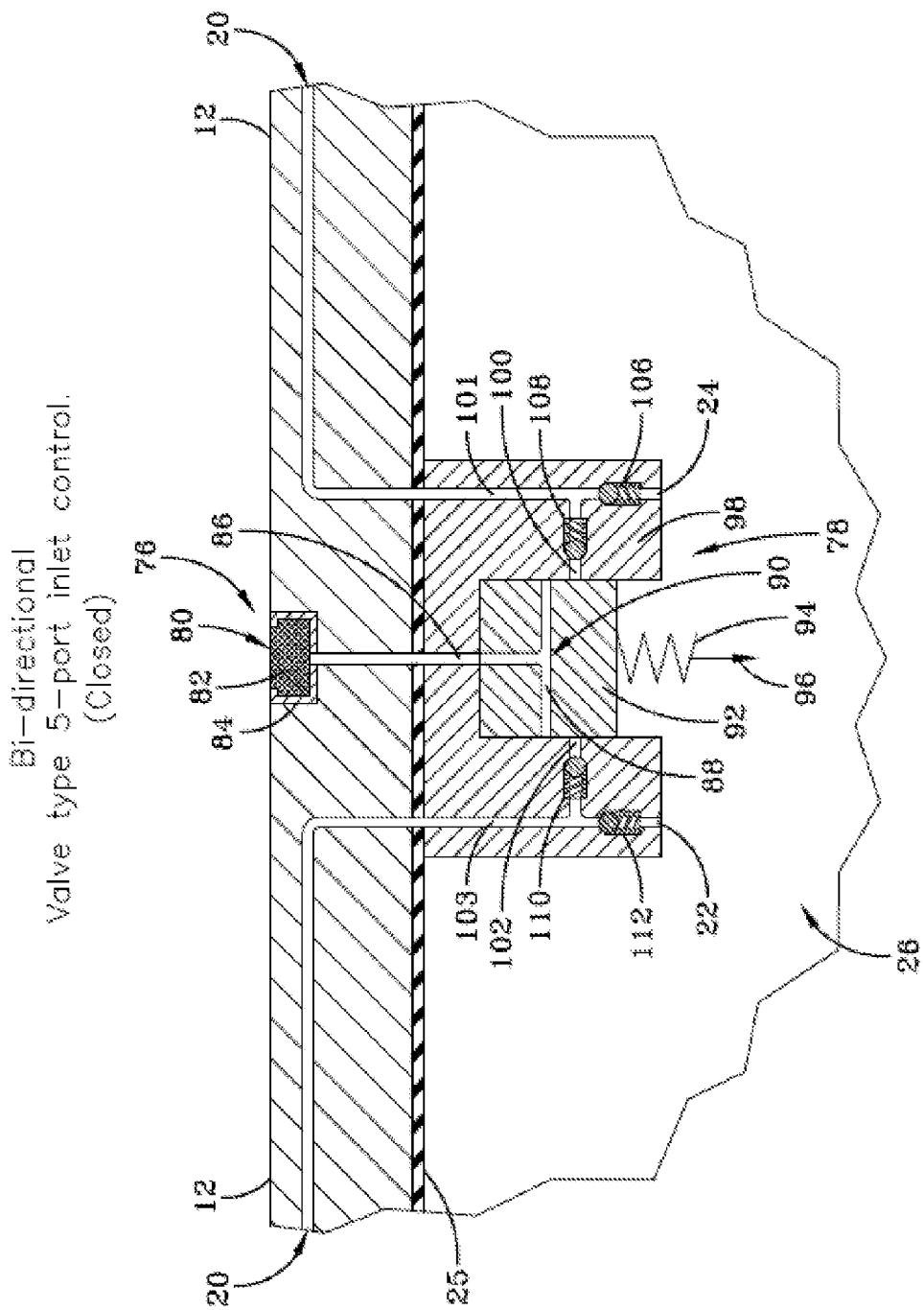
FIG. 4A is a cross sectional schematic diagram of the inlet portal of the example peristaltic pump of FIG. 1 having an alternatively configured bi-directional five-port inlet control valve in the closed position.
Figure 4B:
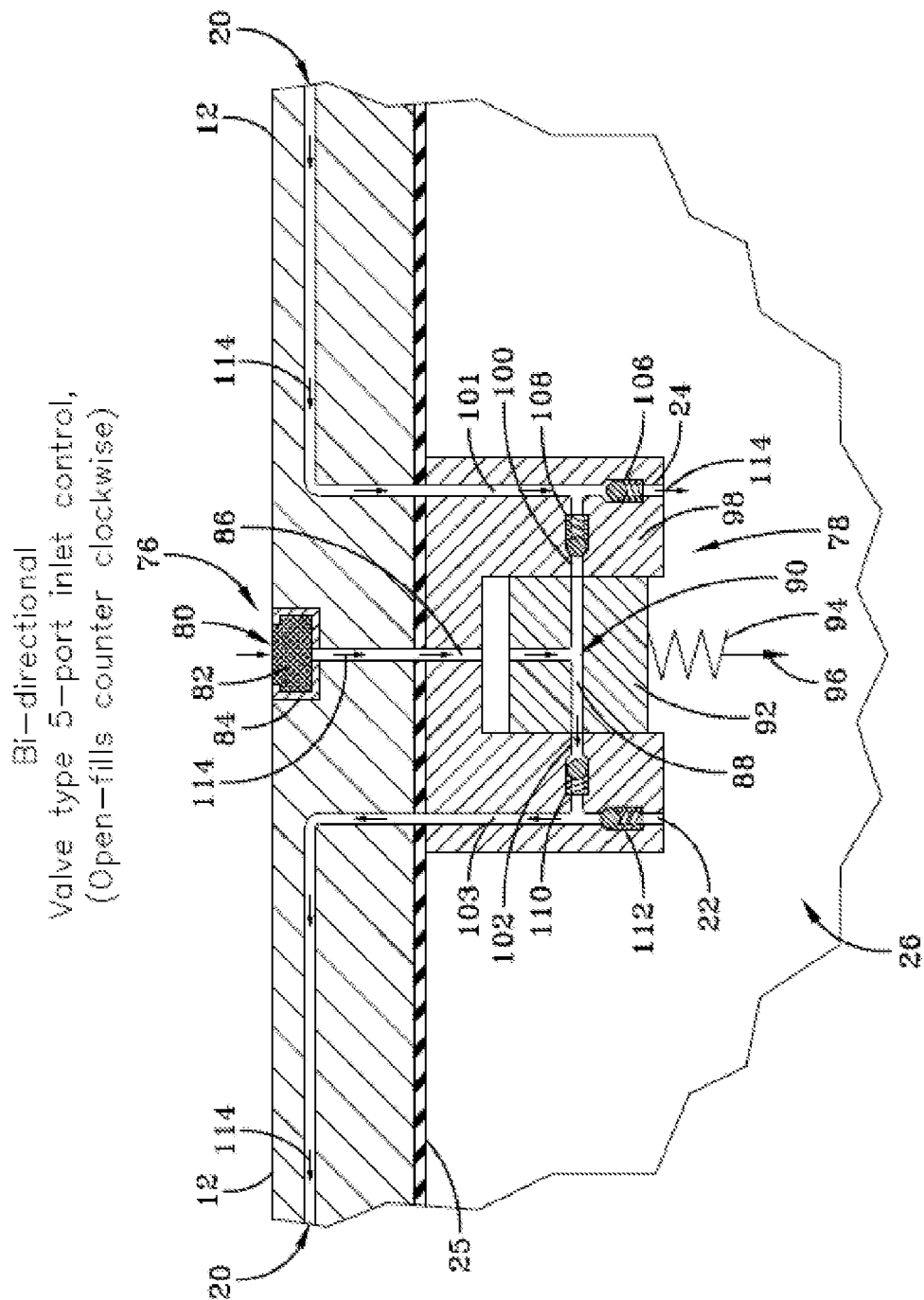
FIG. 4B is a cross sectional schematic diagram of the inlet portal of the example peristaltic pump of FIG. 1 having an alternatively configured bi-directional five-port inlet control valve shown in the open position operable to fill the tire with the tire rotating in a counter clockwise direction.
Figure 4C:
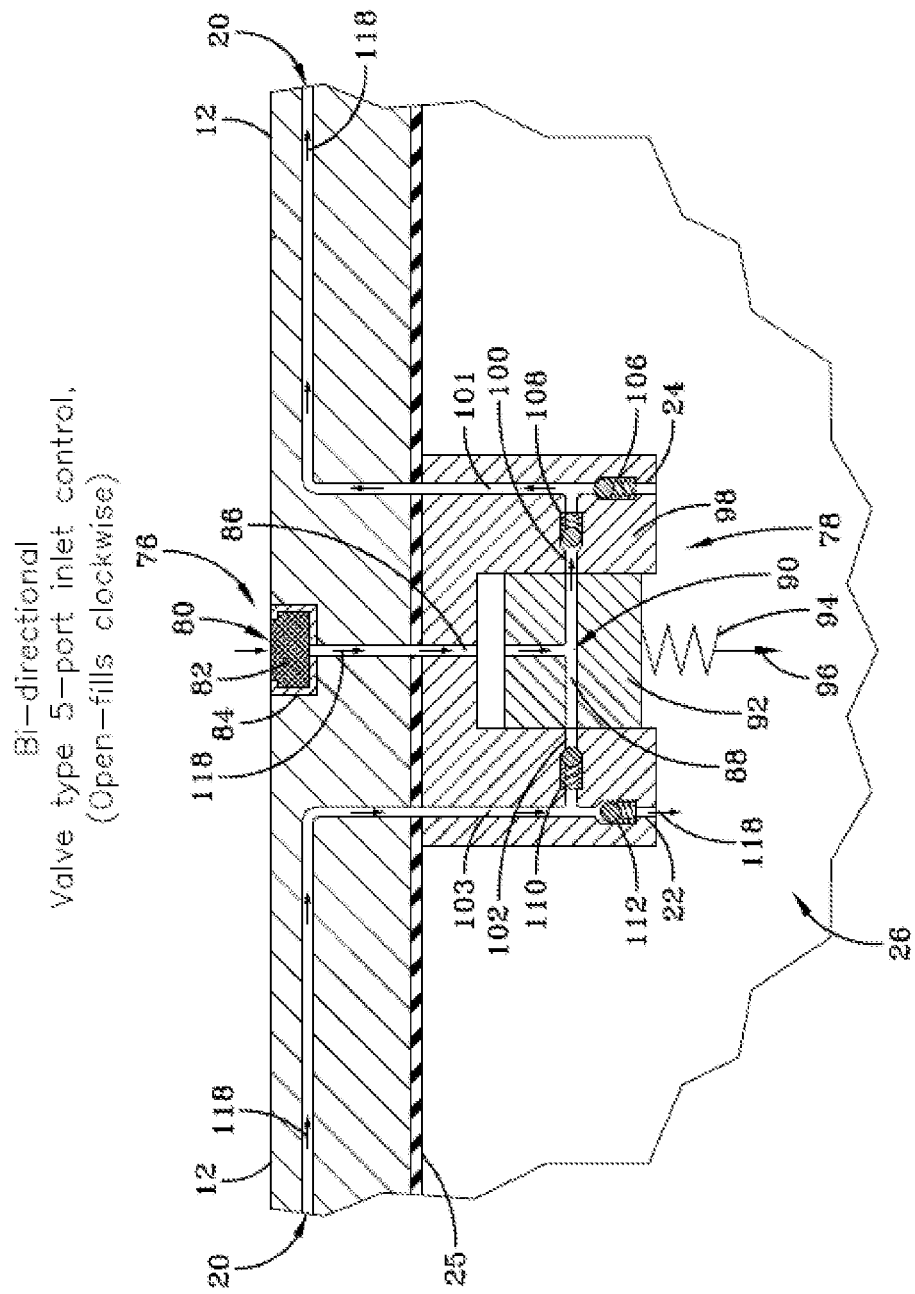
FIG. 4C is a cross-sectional schematic diagram of the inlet portal of the example peristaltic pump of FIG. 1 with the bi-directional valve having an alternatively configured five-port inlet control which fills the tire with tire rotating in a clockwise tire rotation.

FIGS. 4A, 4B & 4C show an alternative example embodiment in which the regulator valve assembly 78 may be a 5-port inlet control configuration. In FIG. 4A, the valve assembly is in the closed position in which air is not input into the tire cavity 26. FIG. 4B shows the valve assembly in the open position with a clockwise tire rotational direction and air flow in the counter clockwise direction. FIG. 4C shows the valve in the open position during a counterclockwise tire rotational direction and air flow in the clockwise direction. In the valve assembly shown in FIGS. 4A, 4B & 4C, air may be admitted into the system through the inlet port assembly 76 to the regulator valve assembly 78. The inlet port assembly 76 may include a filter inlet port 80 and a filter body 82 housed within a filter housing 84. Air passing through the filter body 82 may be directed via the inlet conduit 86 to a transverse piston conduit 88. The junction 90 created by the intersection of the inlet conduit 86 and the piston conduit 88 may also be located within the piston 92.

The piston 92 may be biased by the spring 94 in an open condition represented by FIGS. 4B & 4C with the air pressure within the tire cavity 26 being less than a preset $P_{REG}$ level. If air pressure within the tire cavity 26 is at or above the $P_{REG}$ level, the cavity air pressure may overcome the biasing spring 94 and move the piston 92 upward within the cylinder 98 into the closed position of FIG. 4A. In the closed position, no air is pumped into the tire cavity 26.

The transverse conduit 88 of the piston 92 may align with the bridging conduits 100, 102 in the open-valve conditions of FIGS. 4B & 4C and may misalign with the bridging conduits 100, 102 when the valve is closed as shown in FIG. 4A. Four one-way valves 106, 108, 110, 112 may be positioned to form inline valves 108, 110 and outlet valves 106, 112. The inline valves 108, 110 may open in opposite directions away from the junction 90 and the outlet valves 112, 106 may open radially inward toward the tire cavity 26. The outlet valves 106, 112 may reside within the outlet conduits 103, 101, respectively, which couple to the passageway 20. The conduits 103, 101 may intersect and connect with the bridging conduits 102, 100, respectively, and continue radially inward beyond the outlet valves 112, 106 to the exit ends 22, 24 at the tire cavity 26.

Operation of the five port valve configuration of FIGS. 4A, 4B & 4C may operate analogously as explained above in regard to the two-port valve of FIGS. 3A, 3B & 3C. FIGS. 2B, 4B show the regulator valve open with the tire rotating clockwise and causing a counterclockwise flow of air within the passageway 20. Air admitted through the input valve assembly 76 may be directed to the junction 90 in the piston 92 by means of the conduit 86. At the junction 90, the air flow cannot pass through the closed valve 108 and thereby may open the valve 110. The air flow may circulate in the direction 114 within the passageway 20 to enter the conduit 101. Air flow at the junction of conduit 101 and the bridging conduit 100 cannot pass through the closed valve 108 and thus may be directed to the open valve 106, allowing the pumped air flow to enter the tire cavity 26.

FIGS. 2A & 4C show operation of the regulator valve with the tire rotating in a counterclockwise direction 136 to pump airflow within the passageway 20 in a clockwise fill direction 118. Air flow 118 in the passageway 20 may be directed to the tire cavity 26 as shown. Operation of the valve in this tire rotation direction and counter air flow direction in FIGS. 2A & 4C may proceed as described above. When air pressure within the tire cavity 26 reaches the desired preset level $P_{REG}$, tire pressure against the piston 92 may force the piston into the closed (conduit-misaligned) position of FIG. 3A and air flow to the tire cavity may be discontinued. A pressure within the tire cavity 26 below the preset desired threshold level $P_{REG}$ may cause the piston 92 to move into the open position of FIGS. 4B & 4C and air to flow in the passageway 20 in the direction indicated as dictated by the direction of tire rotation. Pumping of air may continue throughout the 360 degree rotation of the tire and, as shown, may occur regardless of whether the tire (and vehicle) is going in forward or reverse directions.

FIGS. 5A, 5B, 5C & 5D show another example of regulator valve assembly 78 modified by the inclusion of a bypass valve 120. The bypass valve 120 may be a pressure controlled valve connected to bypass the opening of the check valves 106, 112 when the pressure within the tire cavity 26 exceeds a $P_{SET}$ or $P_{REG}$ value. The bypass valve 120 may ensure that air cannot be introduced into the tire cavity 26 when the air pressure within the cavity is at or greater than the $P_{SET}$ or $P_{REG}$ pressure threshold.

The bypass valve 120 may conduct air in either direction when the pressure within the tire cavity 26 is at or greater than the $P_{SET}$ or $P_{REG}$ value, thereby bypassing air to the outlet valves 106, 112 and preventing the introduction of excessive air into the tire cavity. The bypass valve 120 may connect to the conduit 120 spanning the piston 92 and connecting to the conduits 101, 103 at opposite ends.

Figure 5A:
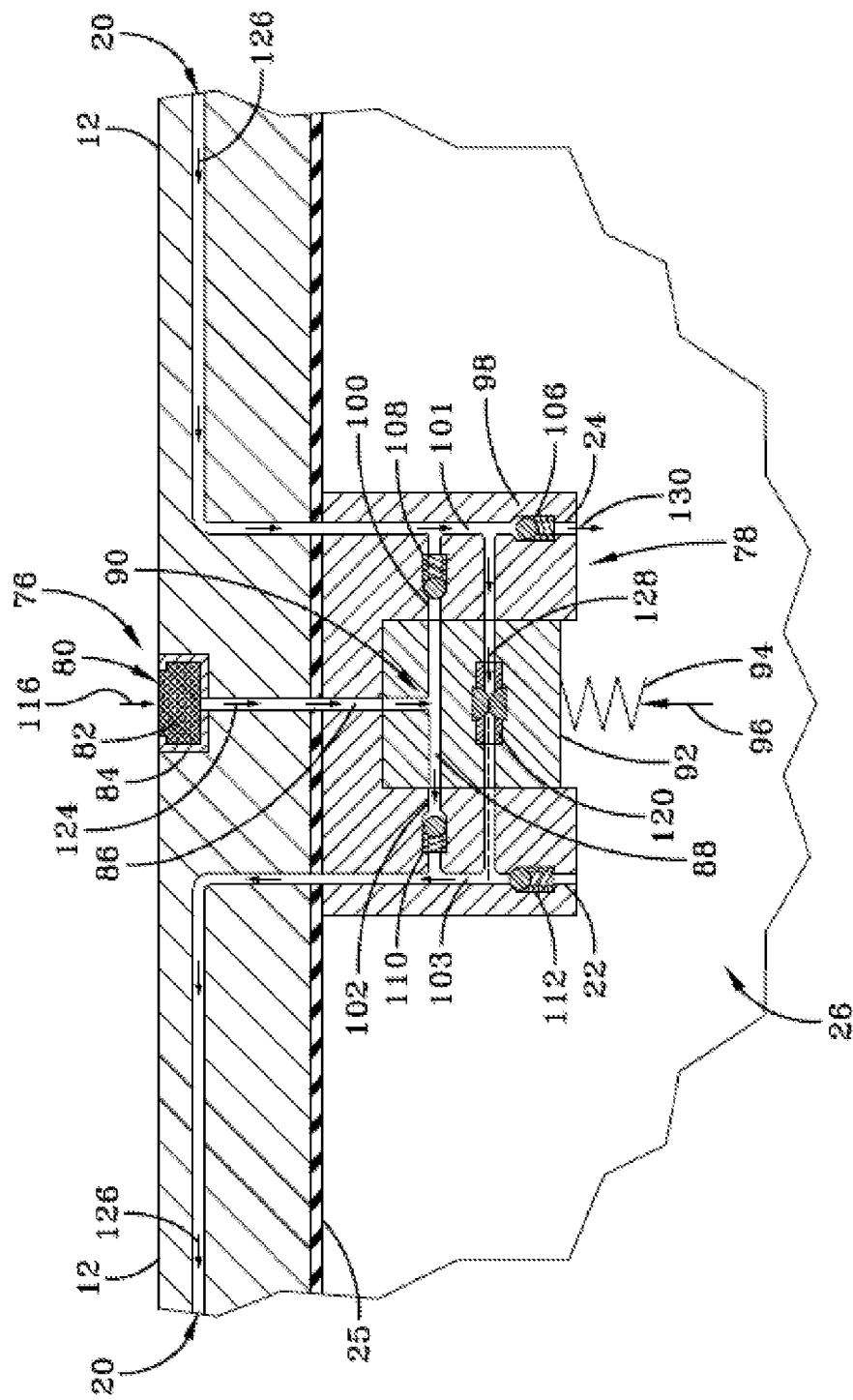
FIG. 5A is a cross-sectional schematic diagram of the inlet portal of an alternative example peristaltic pump bi-direc

FIG. 5A shows a 5-port bypass regulator with the cavity pressure below the threshold $P_{SET}$ or $P_{REG}$, the tire rotating in a clockwise direction, and fill air rotating about the passageway 20 in a counterclockwise direction. In the bypass regulator of FIGS. 5A, 5B, 5C & 5D, the piston 92 may not move between an aligned, open orientation relative to the conduits 100, 102 and a closed, misaligned, orientation, but may remain in alignment in all fill modes (e.g., fixed).

With reference to FIG. 5A, the cavity pressure is below the threshold $P_{SET}$ or $P_{REG}$, causing the bypass valve 120 to close. With the bypass valve 120 closed, the operation of the regulator and air passageway 20 proceeds as discussed above in reference to FIG. 4B. FIG. 5A and FIG. 4B both represent a clockwise rotation of the tire, flow of air into (arrow 124) the tire cavity 26 through filter inlet port 80, and a counterclockwise flow of air (arrow 126) within passageway 20.

In FIG. 5B, for a counterclockwise rotation of the tire and a clockwise fill direction, the bypass valve 120 continues to remain closed so long as the cavity pressure remains below the threshold $P_{SET}$ or $P_{REG}$. Air flow (arrow 128) along the bypass conduit is thereby blocked by the closed bypass valve 120. The air flow and fill direction in FIG. 5B thus proceeds as explained above with regard to the same analogous conditions of FIG. 4B operates. Air circulating in FIG. 5B in the clockwise direction acts to open the outlet valve 112 and pass air in the direction 130 into the tire cavity 26.

Figure 5D:
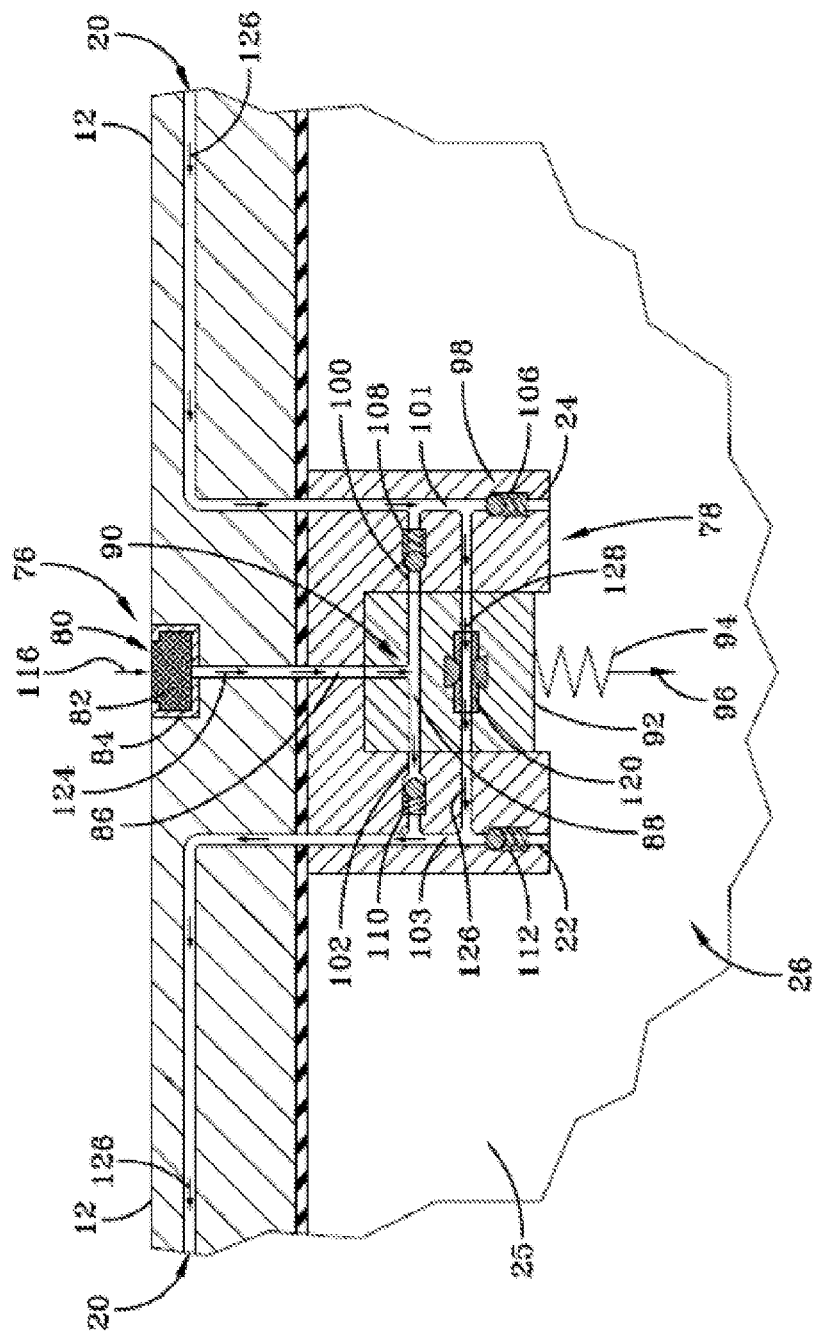
FIG. 5D is a cross-sectional schematic diagram of the inlet portal of the FIG. 5B alternative example peristaltic pump bi-directional valve with counter-clockwise tire rotation and the valve in a bypass mode.

In FIG. 5C, with the cavity pressure at or greater than the $P_{SET}$ or $P_{REG}$, air may circulate in the clockwise direction bypassing the outlet valves 106, 112 and passing instead through the open bypass valve 120. The outlet valves 106, 112 thus remain closed and none of the circulated air (arrow 126) will pass through the outlet 106, 112 and enter the tire cavity 26. FIG. 5D shows the operation of the bypass regulator during an opposite, clockwise rotation of the tire and a counterclockwise air flow path through the air passageway 20. As in FIG. 5C, the tire cavity pressure in FIG. 5D is greater than the threshold $P_{SET}$ or $P_{REG}$ and the bypass valve 126 is open and directing the counterclockwise air flow (direction arrow 126) through the bypass conduit, rather than through the outlet valves 106, 112. Air flow into the tire cavity 26 is thus precluded. The bypass regulator of FIGS. 5A, 5B, 5C & 5D thereby ensures that under no circumstances will air be forced into the tire cavity 26 when the pressure within the cavity is at or greater than the set threshold $P_{SET}$ or $P_{REG}$.

From the foregoing, it will be appreciated that the peristaltic pump and regulator system provides the means for keeping the air pressure within the tire cavity 26 at a desired pressure level $P_{SET}$ or $P_{REG}$, but at no greater pressure that the desired pressure level. The pump assembly 16 may include the elongate annular air passageway 20 enclosed within a bending region of the tire. The air passageway 20 may operatively close and open, segment by segment, as the bending region of the tire passes adjacent a rolling tire footprint to pump air along the air passageway. The pump assembly 16 may further include the air inlet port assembly 28 positioned to channel outside air into the air passageway 20 at an inlet junction (38 or 90). The pair of inline valves 62, 64 (or 108, 110) may direct inlet air in opposite directions into the air passageway 20. The pair of outlet valves 66, 68 (or 106, 112) may be positioned at a downstream side of a respective inline valve with the outlet valves directing a bi-directional flow from the downstream side of a respective inline valve therethrough and toward the tire cavity 26.

The inlet port assembly 28 may further extend the control conduit between an inlet air flow/air inlet portal and an upstream side of the inlet valves. The piston 44 may operate under the influence of the valve spring 48 to interrupt inlet air through the control junction 38 to the upstream side of the inlet valves when the air pressure within the tire cavity 26 is above the threshold air pressure level $P_{SET}$ or $P_{REG}$. The inlet and outlet valves may selectively open with bi-directional air flow within the air passageway 20 dictated by direction in which the tire rotates.

Figure 6:
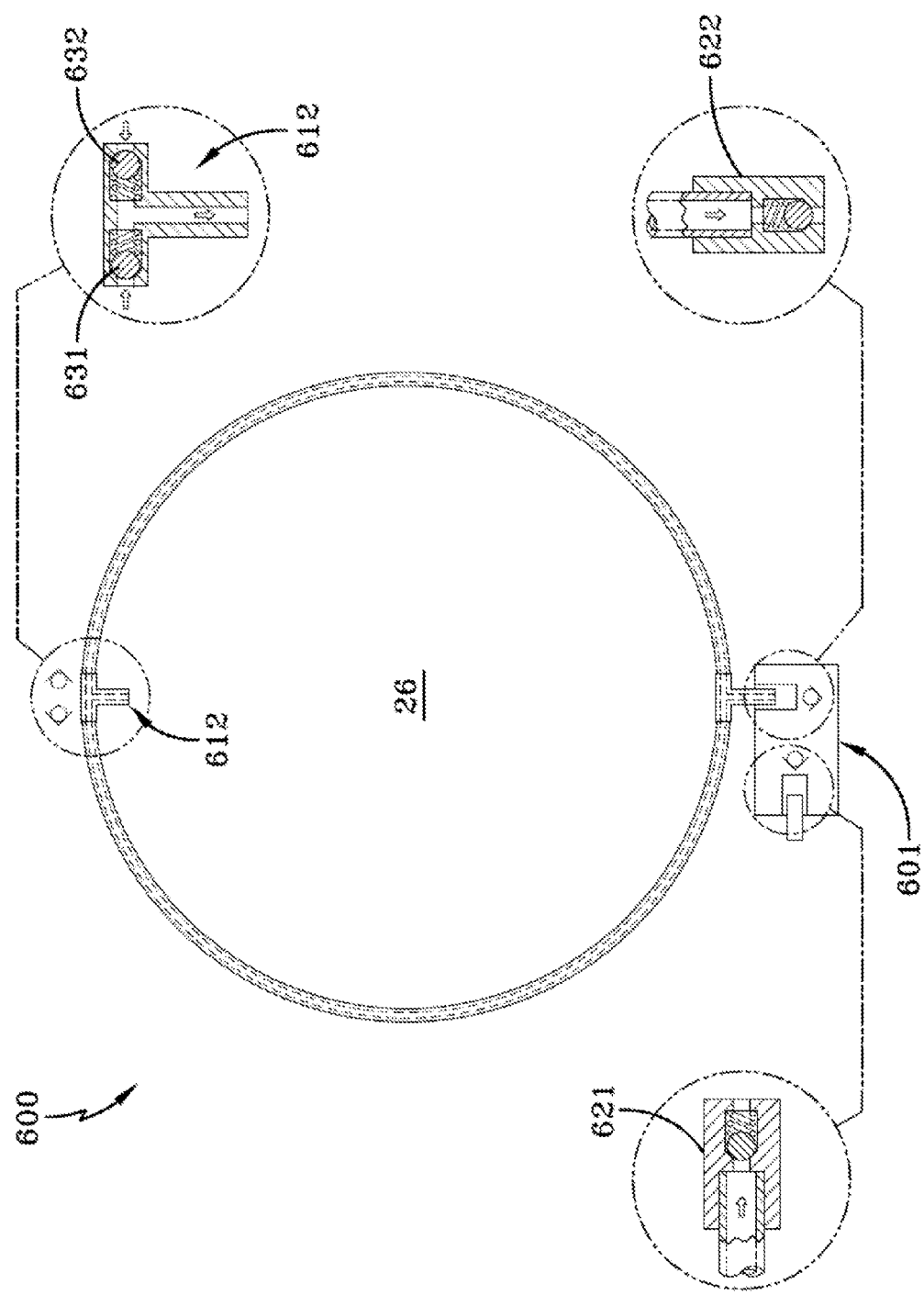
FIG. 6 is a schematic diagram of a peristaltic pump and inlet valve assembly in accordance with the present invention.

In accordance with the present invention, an inlet control valve 601 may be used with a peristaltic pump assembly 600 similar to the above described example assemblies 16. Such an assembly 600 may be bi-directional and may simultaneously utilize the full 360° pumping length of the air passageway 20 (e.g., not just 180° at one time). The assembly 600 (FIGS. 6-8) may include the inlet control valve 601 and an outlet tee structure 612 positioned 180° opposite the inlet control valve in the air passageway 20 for moving air into the tire cavity 26. The inlet control valve 601 may include two inlet check valves 621, 622 for ensuring air flow only into, and not out of, the inlet control valve, the air passageway 20, a corresponding plain tee inlet structure 611, and the tire cavity 26. The inlet check valves 621, 622 may be ball check valves, as shown in FIG. 6. The outlet tee structure 612 may include two outlet check valves 631, 632 for ensuring air flow only into, and not out of, the tire cavity 26. The outlet check valves 631, 632 may be ball check valves, as shown in FIG. 6.

Figure 7:
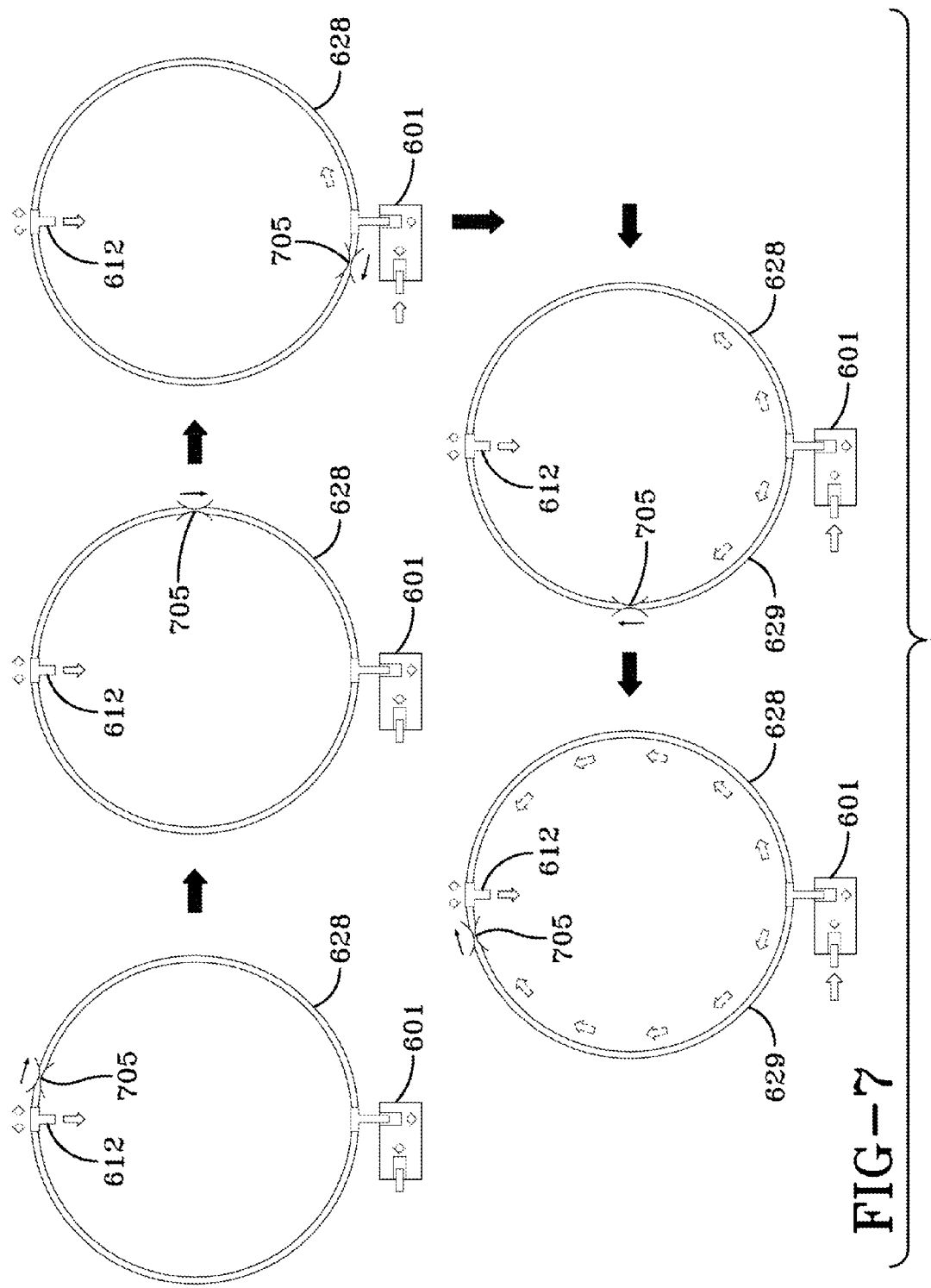
FIG. 7 is a schematic diagram of operating positions of the peristaltic pump and inlet valve assembly of FIG. 6 under a first operating condition.

FIG. 7 schematically shows the operation of the assembly 600 for a clockwise rotation of the tire footprint 134 at the beginning of a pumping cycle (e.g., one tire rotation). The first view shows a pinch point 705 (e.g., the sidewall(s) 12 located adjacent the rolling tire footprint 134) in a one o'clock position just to the right of the outlet tee structure 612 moving away from the outlet tee structure.

As the pinch point 705 rotates to the four o'clock position of the second view, air is forced to flow through the air passageway 20 from the four o'clock position to the outlet tee structure 612 and into the tire cavity 26. The inlet check valve 622 and the outlet check valve 632 block air flow into the inlet control valve 601 and into a trailing portion 628 of the air passageway 20, respectively.

As the pinch point 705 rotates to the seven o'clock position of the third view, air continues to be forced to flow through the air passageway 20 from the seven o'clock position to the outlet tee structure 612 and into the tire cavity 26. Vacuum in the trailing portions 628, 629 may now receive air from the inlet control valve 601.

As the pinch point 705 rotates to the nine o'clock position of the fourth view, the remaining air continues to be forced to flow through the air passageway 20 from the nine o'clock position to the outlet tee structure 612 and into the tire cavity 26. Simultaneously, the vacuum in the trailing portions 628, 629 may continue to fill the trailing portions with air through the inlet control valve 601.

As the pinch point 705 rotates to the eleven o'clock position of the fifth view, the remaining air continues to be forced to flow through the air passageway 20 from the eleven o'clock position to the outlet tee structure 612 and into the tire cavity 26. Simultaneously, the vacuum in the trailing portions 628, 629 may continue to fill with air through the inlet control valve 601. This concludes one pumping cycle for this clockwise direction of rotation. As the pinch point 705 rotates back to the one o'clock position of the first view, a new pumping cycle may begin against a full 360° volume of air in the now full trailing portions 628, 629 of the air passageway 20.

Figure 8:
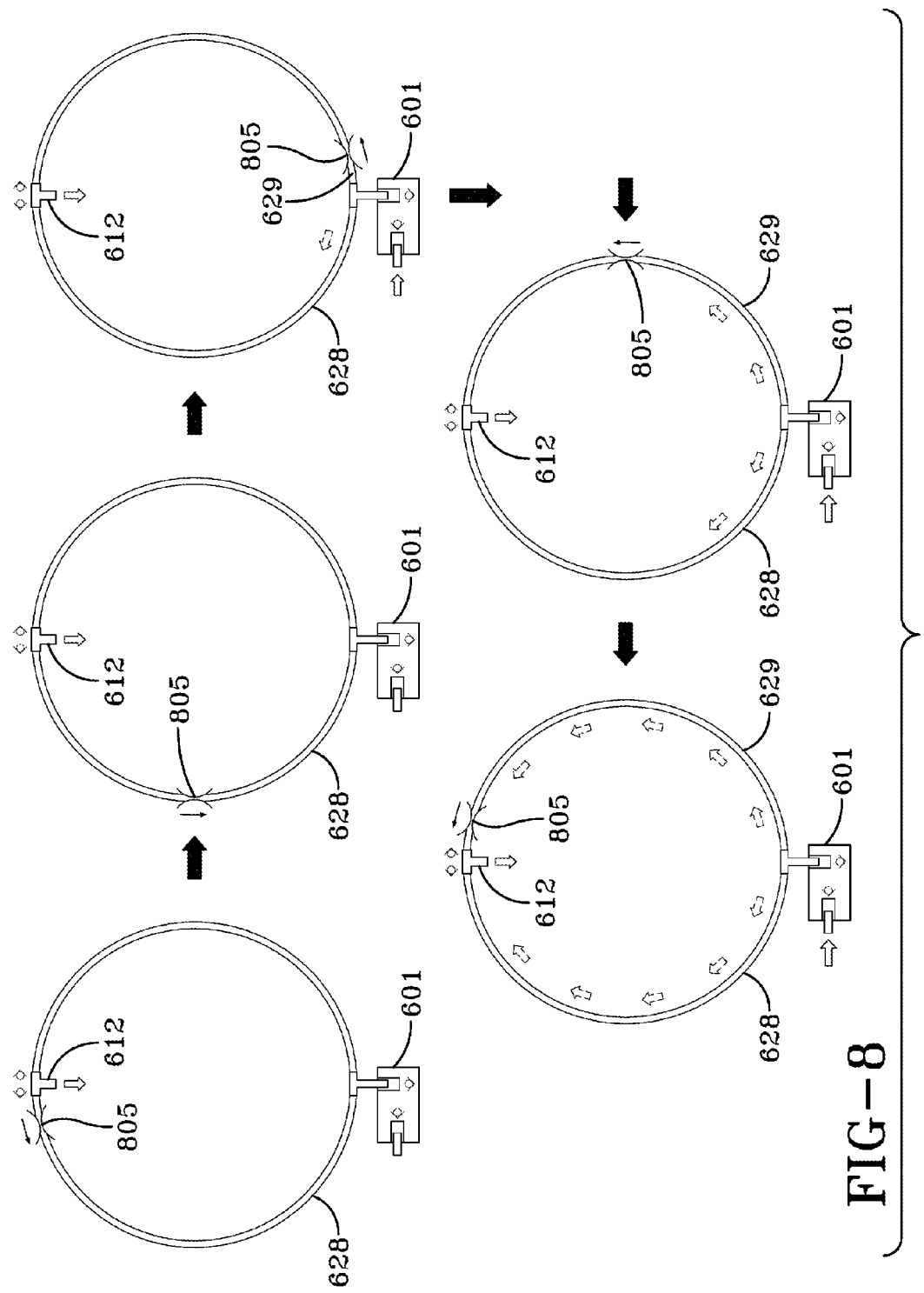
FIG. 8 is a schematic diagram of operating positions of the peristaltic pump and inlet valve assembly of FIG. 6 under a first operating condition.

FIG. 8 schematically shows the operation of the assembly 600 for a counterclockwise rotation of the tire footprint 134 at the beginning of a pumping cycle (e.g., one tire rotation). The first view shows a pinch point 805 (e.g., the sidewall(s) 12 located adjacent the rolling tire footprint 134) in an eleven o'clock position just to the left of the outlet tee structure 612 moving away from the outlet tee structure.

As the pinch point 805 rotates to the nine o'clock position of the second view, air is forced to flow through the air passageway 20 from the nine o'clock position to the outlet tee structure 612 and into the tire cavity 26. The inlet check valve 622 and the outlet check valve 631 block air flow into the inlet control valve 601 and into a trailing portion 628 of the air passageway 20, respectively.

As the pinch point 805 rotates to the five o'clock position of the third view, air continues to be forced to flow through the air passageway 20 from the five o'clock position to the outlet tee structure 612 and into the tire cavity 26. Vacuum in the trailing portions 628, 629 may now receive air from the inlet control valve 601.

As the pinch point 805 rotates to the nine o'clock position of the fourth view, the remaining air continues to be forced to flow through the air passageway 20 from the nine o'clock position to the outlet tee structure 612 and into the tire cavity 26. Simultaneously, the vacuum in the trailing portions 628, 629 may continue to fill the trailing portions with air through the inlet control valve 601.

As the pinch point 805 rotates to the one o'clock position of the fifth view, the remaining air continues to be forced to flow through the air passageway 20 from the one o'clock position to the outlet tee structure 612 and into the tire cavity 26. Simultaneously, the vacuum in the trailing portions 628, 629 may continue to fill with air through the inlet control valve 601. This concludes one pumping cycle for this counterclockwise direction of rotation. As the pinch point 805 rotates back to the eleven o'clock position of the first view, a new pumping cycle may begin against a full 360° volume of air in the now full trailing portions 628, 629 of the air passageway 20.

Variations in the present invention are possible in light of the description of it provided herein. While certain representative examples and details have been shown for the purpose of illustrating the subject invention, it will be apparent to those skilled in this art that various changes and modifications may be made therein without departing from the scope of the subject invention. It is, therefore, to be understood that changes may be made in the particular examples described which may be within the fully intended scope of the present invention as defined by the following appended claims.

What is claimed is:

1. An air maintenance tire and pump assembly comprising:
a tire having a tire cavity, first and second sidewalls extending from first and second tire bead regions, respectively, to a tire tread region;
an elongate substantially annular air passageway enclosed within a bending region of the sidewalls, the air passageway operatively closing and opening, segment by segment, as the bending region of the sidewalls passes adjacent a rolling tire footprint to pump air along the air passageway;
an air inlet port assembly coupled to, and in air flow communication with, the air passageway at an inlet air passageway junction, the air inlet port assembly being operable to channel inlet air from outside of the tire into the air passageway, the air inlet port assembly including an inlet control valve and an outlet tee structure positioned 180° opposite the inlet control valve in the air passageway for moving air into the tire cavity, the inlet control valve including two inlet check valves for ensuring air flow only into, and not out of, the inlet control valve, the air passageway, a corresponding plain tee inlet structure, and the tire cavity.

2. The air maintenance tire and pump assembly as set forth in claim 1 wherein the inlet check valves are ball check valves.

3. The air maintenance tire and pump assembly as set forth in claim 1 wherein the outlet tee structure includes two outlet check valves for ensuring air flow only into, and not out of, the tire cavity.

4. The air maintenance tire and pump assembly as set forth in claim 3 wherein the outlet check valves are ball check valves.

5. The air maintenance tire and pump assembly as set forth in claim 1 wherein a first pinch point is defined by a portion of the air passageway adjacent the rolling tire footprint such that the first pinch point rotates in a clockwise direction about the tire.

6. The air maintenance tire and pump assembly as set forth in claim 5 wherein two 180° portions of the air passageway both pump air into the tire cavity as the first pinch point rotates in the clockwise direction.

7. The air maintenance tire and pump assembly as set forth in claim 6 wherein a second pinch point is defined by a portion of the air passageway adjacent the rolling tire footprint such that the second pinch point rotates in a counterclockwise direction about the tire.

8. The air maintenance tire and pump assembly as set forth in claim 7 wherein the two 180° portions of the air passageway both pump air into the tire cavity as the second pinch point rotates in the clockwise direction.

9. A method for pumping air into a tire cavity of a tire comprising the steps of:
- operatively closing and opening an annular air passageway within a sidewall of the tire, segment by segment, as a bending region of the sidewall passes adjacent a rolling tire footprint to pump air along the air passageway;
- coupling an air inlet port assembly to, and in air flow communication with, the air passageway at an inlet air passageway junction;
- channeling inlet air from outside of the tire through the air inlet port assembly into the air passageway such that a pinch point of the air passageway travels about the along the air passageway; and
- pumping air into the tire cavity by two 180° portions of the air passageway as the first pinch point rotates in the clockwise direction.

10. The method as set forth in claim 9 further including the step of rotating the pinch point to a one o'clock position just to the right of an outlet tee structure such that the pinch point is moving away from the outlet tee structure.

11. The method as set forth in claim 10 further including the step of rotating the pinch point to a four o'clock position relative to the outlet tee structure such that the pinch point is moving away from the outlet tee structure such that air is forced into a tire cavity.

12. The method as set forth in claim 11 further including the step of rotating the pinch point to a seven o'clock position relative to the outlet tee structure such that the pinch point is moving toward the outlet tee structure.

13. The method as set forth in claim 12 further including the step of rotating the pinch point to a nine o'clock position relative to the outlet tee structure such that the pinch point is moving toward the outlet tee structure such that air continues to be forced to flow through the air passageway from the nine o'clock position to the outlet tee structure and into the tire cavity and, simultaneously, vacuum in trailing portions of the air passageway forces the trailing portions to fill with air through the inlet control valve.

14. The method as set forth in claim 13 further including the step of rotating the pinch point to a eleven o'clock position relative to the outlet tee structure such that the pinch point is moving toward the outlet tee structure as air continues to be forced to flow through the air passageway from the eleven o'clock position to the outlet tee structure and into the tire cavity, and, simultaneously, vacuum in the trailing portions continue to fill with air through the inlet control valve.

* * * * *